(12) United States Patent
Santana et al.

(10) Patent No.: US 10,478,894 B2
(45) Date of Patent: *Nov. 19, 2019

(54) CARBON AS AN AIDE FOR DUCTILE NANOCELLULAR FOAM

(71) Applicant: United Technologies Corporation, Farmington, CT (US)

(72) Inventors: Jose L. Santana, Vernon, CT (US); Weina Li, South Glastonbury, CT (US); Michael J. Birnkrant, Wethersfield, CT (US)

(73) Assignee: United Technologies Corporation, Farmington, CT (US)

(*) Notice: Subject to any disclaimer, the term of this patent is extended or adjusted under 35 U.S.C. 154(b) by 302 days.

This patent is subject to a terminal disclaimer.

(21) Appl. No.: 15/232,149

(22) Filed: Aug. 9, 2016

(65) Prior Publication Data

US 2018/0043433 A1 Feb. 15, 2018

(51) Int. Cl.
| | | |
|---|---|---|
| *B22F 3/11* | (2006.01) | |
| *B22F 3/10* | (2006.01) | |
| *B22F 5/04* | (2006.01) | |
| *B22F 3/00* | (2006.01) | |
| *B01J 32/00* | (2006.01) | |
| *B01J 37/02* | (2006.01) | |
| *B01J 37/03* | (2006.01) | |

(Continued)

(52) U.S. Cl.
CPC ............ *B22F 3/11* (2013.01); *B01D 39/2044* (2013.01); *B01D 39/2058* (2013.01); *B01J 23/755* (2013.01); *B01J 32/00* (2013.01); *B01J 35/06* (2013.01); *B01J 37/0225* (2013.01); *B01J 37/031* (2013.01); *B01J 37/084* (2013.01); *B22F 3/002* (2013.01); *B22F 3/1007* (2013.01); *B22F 3/1103* (2013.01); *B22F 3/1143* (2013.01); *B22F 5/04* (2013.01); *B01D 2239/025* (2013.01); *B22F 2998/10* (2013.01); *B22F 2999/00* (2013.01)

(58) Field of Classification Search
CPC .... B22F 3/11; B22F 5/04; B22F 3/002; B22F 3/1007; B22F 3/1143; B22F 3/1103; B22F 2998/10; B22F 2999/00; B01D 39/00; B01J 32/00

See application file for complete search history.

(56) References Cited

U.S. PATENT DOCUMENTS

| | | | |
|---|---|---|---|
| 8,779,048 B2 * | 7/2014 | Federzoni | B22F 3/225 524/430 |
| 2007/0212538 A1 * | 9/2007 | Niu | H01B 1/04 428/367 |

(Continued)

FOREIGN PATENT DOCUMENTS

| | | |
|---|---|---|
| EP | 2921245 A1 | 9/2015 |
| EP | 2949634 A1 | 12/2015 |
| WO | 0041808 A1 | 7/2000 |

OTHER PUBLICATIONS

European Search Report dated Dec. 18, 2017 for corresponding European Patent Application No. 17185409.4.

*Primary Examiner* — Anthony J Zimmer
(74) *Attorney, Agent, or Firm* — Bachman & LaPointe, P.C.

(57) ABSTRACT

A method of fabricating an article includes providing an arrangement of loose nanowires and bonding the loose nanowires in the presence of carbon together into a unitary cellular structure.

13 Claims, 3 Drawing Sheets

(51) Int. Cl.
    *B01J 37/08*     (2006.01)
    *B01J 23/755*     (2006.01)
    *B01J 35/06*     (2006.01)
    *B01D 39/20*     (2006.01)

(56) References Cited

U.S. PATENT DOCUMENTS

| | | |
|---|---|---|
| 2008/0264259 A1 | 10/2008 | Leung |
| 2015/0209864 A1 | 7/2015 | Li et al. |
| 2015/0345302 A1 | 12/2015 | Birnkrant et al. |
| 2016/0175933 A1 | 6/2016 | Li et al. |

\* cited by examiner

CARBON AS AN AIDE FOR DUCTILE NANOCELLULAR FOAM

BACKGROUND

This disclosure relates to fabrication of nanocellular articles to improve flexibility.

Inorganic materials structured on the nanoscale often have enhanced chemical and physical properties that can find application in a number of fields. Nanocellular materials, such as porous metal foams, can be used in filters, electrodes, catalysts, refractory articles or other applications.

There are a number of methods for fabricating nanocellular materials. For example, metallic nanocellular materials can be fabricated using combustion synthesis, metal dealloying or sol-gel processing with supercritical drying. While chemical synthesis such as the sol-gel method may be useful, these techniques can be relatively complex and involve processing of numerous chemical intermediates, including but not limited to oxides that require thermochemical reduction of the oxide to the desired metal.

SUMMARY

In accordance with the present disclosure, there is provided a process of fabricating an article comprising: arranging nanowires into an assembly; and bonding the nanowires together into a unitary cellular structure in the presence of carbon.

In another and alternative embodiment, prior to the bonding, forming the assembly of nanowires into a geometry of an end-use article.

In another and alternative embodiment, forming of the assembly of nanowires into the geometry includes depositing the assembly of nanowires into a mold.

In another and alternative embodiment, bonding is performed by thermal sintering the nanowires.

In another and alternative embodiment, at least a portion of the nanowires are nickel or a nickel alloy.

In another and alternative embodiment, the assembly of nanowires includes nanowires of differing compositions In another and alternative embodiment, at least a portion of the nanowires are a substantially pure metal.

In another and alternative embodiment, at least a portion of the nanowires are a ceramic material.

In another and alternative embodiment, the method further comprises introducing carbon a gas containing carbon into a furnace.

In another and alternative embodiment, the gas containing carbon comprises $H_2+N_2$, and C source.

In another and alternative embodiment, the gas containing carbon comprises methane gas.

In another and alternative embodiment, the process further comprises introducing said carbon via pyrolysis of a polymer.

In another and alternative embodiment, the process includes conducting the bonding in an environment having a gas that reacts with the nanowires to alter the composition of the nanowires.

In accordance with the present disclosure, there is provided a method of fabricating an article, the method comprises providing a dispersion of nanowires in a first carrier fluid; combining the dispersion with a solution including at least one alloy element in a second carrier fluid; removing the first carrier fluid and the second carrier fluid to provide an arrangement of dry, loose nanowires including the at least one alloy element; and bonding in a furnace in the presence of carbon, the arrangement of nanowires together into a unitary cellular structure.

In another and alternative embodiment, at least a portion of the nanowires are metallic.

In another and alternative embodiment, at least a portion of the nanowires are selected from the group consisting of a nickel alloy, ceramic, Fe-based material, Mo-based material, Co-based material, nitrides and the like.

In another and alternative embodiment, the bonding includes thermal sintering.

In another and alternative embodiment, the method includes, prior to the bonding, forming the dry, loose nanowires into a geometry of an end-use article.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Disclosed herein are examples of a method for fabricating an article using nanowires. The article can be a gas turbine engine article, but the present disclosure is not limited in application to turbine engine articles and will also find applicability in filters, electrodes, catalysts, refractory articles, and many other end uses. For example, the article can be an article that is used in a relatively severe environment, such as environments requiring high temperature resistance, high corrosion resistance, or high strength, or environments where superalloy, intermetallic, or ceramic materials are used. In a gas turbine engine, the example article can be a component in a propulsion fan, a compressor, a combustor, or a turbine but is not limited to such engine articles.

Due to its submicron ligament dimensions, a nanocellular material may have a substantially increased strength-to-weight ratio compared with metal foams that have ligament diameters greater than one micron. In addition, the mechanical properties (strength-to-weight ratio, elastic modulus, etc.) of the metal foam may be correlated with the diameter (d) of the ligaments. In general, the specific mechanical strength properties of the metal foam may increase as the diameter (d) of the ligaments decrease. A desired submicron diameter (d) of the ligaments may be selected in order to control specific mechanical properties of the metal foam, such as, but not limited to, elastic modulus, thermo-mechanical fatigue and strength-to-weight ratio. Once the desired ligament diameter is selected, the metal foam may be prepared under reaction conditions that provide the desired ligament diameters. In accordance, nanocellular materials may be useful in many different applications. Furthermore, nano-materials that are compatible with net-shape production, near-net-shape fabrication and additive manufacturing may also be useful. It may also be useful to solution process nanocellular materials and use bulk and scalable processes to fabricate articles.

Nanocellular material fabrication techniques are limited in the size and geometry of the articles that can be formed. Despite being superior materials, the nanocellular material can be left in a relatively rigid state after sintering. The Ni NCF is relatively rigid and fragile, and is therefore susceptible to fracture and can be difficult to conform onto curved surfaces or simply bend post analysis.

As will be described, the present disclosure mitigates the effects of stress and rigidity, thereby avoiding scale-up limits and enabling the fabrication of larger end-use articles which require shape flexibility.

Figure 1:
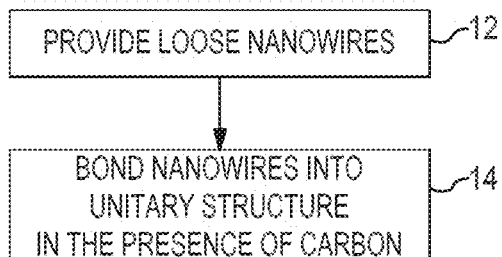
FIG. 1 shows an example method of fabricating an article using nanowires and carbon.

FIG. 1 illustrates a method 10 of fabricating an article using nanowires. Although the method 10 may be used to fabricate end-use articles of cellular materials, such as micro- and nano-cellular materials. The method 10 includes step 12 of providing an arrangement of loose nanowires. For example, the nanowires can be synthesized from a variety of elements to make single element nanowire. A nanowire may also be composed of two or more elements. The synthesized nanowires can be mixed or used as prepared with other nanomaterials.

The nanowires are then arranged into the shape of a puck or an article using a deposition technique or mold. At step 14, the nanowires are then bonded into a unitary structure in the presence of graphitic carbon. For example, the nanowires can be sintered together in the presence of carbon using a suitable technique to form a nanocellular foam (NCF) article.

Figure 2:
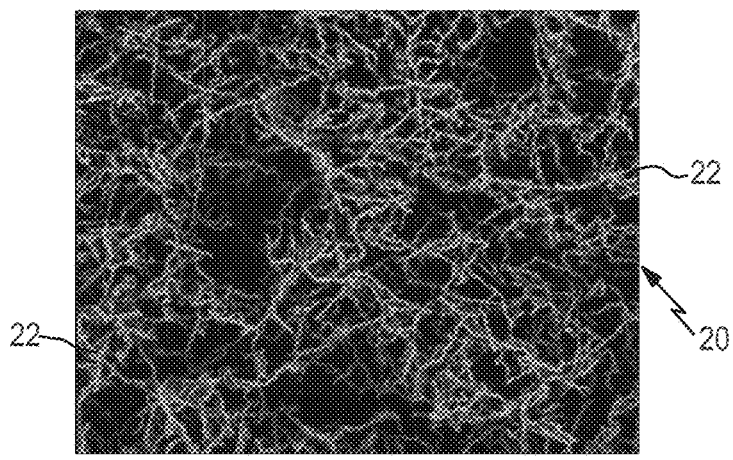
FIG. 2 shows a micrograph of an arrangement of loose nanowires.

The loose nanowires serve as the fundamental "building blocks" for fabricating an article. FIG. 2 illustrates an arrangement, or assembly 20 of loose nanowires 22. In this example, the nanowires 22 are dry and substantially free of any solvent/carrier fluid. The nanowires have a nanoscale maximum cross-sectional size, perpendicular to the elongated direction. For example, the maximum cross-sectional size can be 1 micrometer or less, 500 nanometers or less, or 250 nanometers or less.

In one further example, nickel nanowires of 120 nanometers in diameter and greater than 5 micrometers in length were synthesized according to known techniques. The nickel nanowires were polycrystalline with a grain size of approximately 22 nanometers and had a face centered cubic crystal lattice. The nickel nanowires can be used as the starting material for building an article.

The nanowires 22 are then assembled into the geometry of an article using a mold or deposition technique. The assembling of the nanowires 22 into the desired geometry can be part of step 12 of the method 10, wherein the nanowires 22 can be provided in step 12 in the desired geometry. In one example a mold of the desired article shape is filled with nanowires 22. The nanowires 22 are then compressed to consolidate the nanowires 22. The pressure used to consolidate the nanowires 22 impacts the final pore size and shape. The relationship between pressure applied and pore size are inverse such that higher pressures result in smaller pore sizes. The consolidated nanowires 22 in the shape of the article can then be transferred to step 14 for bonding in the presence of carbon. Another example of constructing an article can include depositing the nanowires 22 on a substrate. Successive deposition of nanowire layers can be built up to form an article, or a portion thereof.

The nanowires 22 assembled into the geometry of an article using a mold can be part of step 12 of the method 10, wherein the mold can be provided in step 12 in the desired geometry. The mold in one example was porous or "honeycombed" to allow the gasses containing carbon in the furnace to flow through the mold and infiltrate the component. The gasses containing carbon can be chosen to perform a number of different chemical reactions with the nanowires that control the sintering process, as well as provide flexibility to the final product. The control of the sintering process can be in the form of either facilitating or hindering the sintering.

Although the nanowires 22 are loose, they are entangled. The friction between the nanowires 22 and/or electrostatic attraction between the nanowires 22 can lightly and non-permanently hold the nanowires 22 together in a particular arrangement. In an alternative, binding agents can be used to hold the nanowires 22 together in a particular arrangement in a green state to permit handling and processing as well other elemental additions. In one particular example, the carbon source (e.g. CH4, solid C-containing materials) also provided elemental carbon to the alloy. At this stage however, the nanowires 22 are not permanently bonded together.

Figure 3:
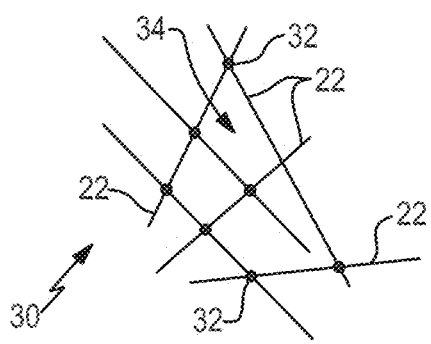
FIG. 3 shows a schematic of the nanowires after sintering to form an article.
Figure 5:
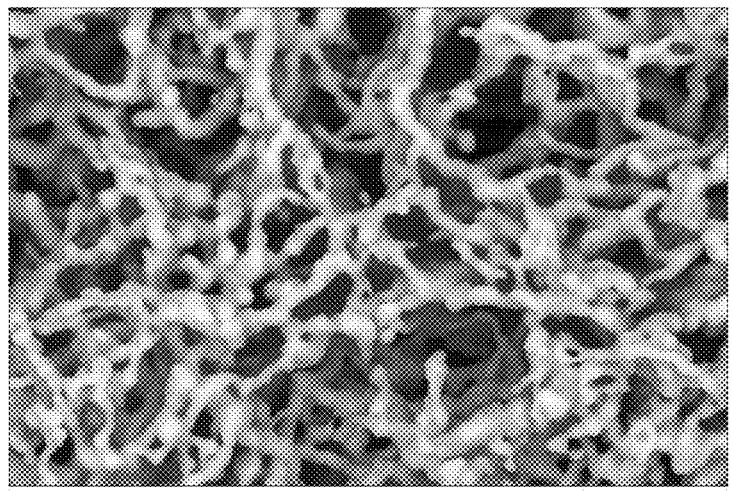
FIG. 5 is a micrograph of the nanocellular foam in an example end-use article formed from the nanocellular material processes disclosed herein.

The loose arrangement 20 of nanowires 22 is then bonded together into a unitary structure. FIG. 5 shows a micrograph of sintered nanowires, and FIG. 3 illustrates a representative portion 30 of an example unitary structure made according to the example method. In this example, the nanowires 22 were subjected to a thermal sintering process in the presence of carbon to bond the nanowires 22 together. During the thermal sintering, the surfaces of the nanowires 22 that are in contact with each other permanently bond together at nodes 32. For example, for metallic nanowires, the nanowires metallurgically bond together at the nodes 32. The mechanism of bonding can differ depending, at least in part, on the selected composition of the nanowires 22, and may be a combination of different mechanisms. Such mechanisms may include, but are not limited to diffusion, solid-state mass transport, and melt flow. The sintering temperature may therefore depend, at least in part, on the composition selected for the nanowires 22. In one example, the sintering temperature is high enough to cause diffusion and/or solid state mass transport, but is below the melting temperature of the composition. In another example, the sintering temperature may be above the melting temperature of a portion of the nanowire or a group of nanowires in the article, but the exposure time is controlled such that the surfaces of the nanowires 22 melt and bond while the cores of the nanowires 22 remain solid and support the structure during sintering. In one further example, the nanowires 22 are placed in two ceramic holders and treated at an elevated temperature in a carbon enriched environment. The temperature can be 500° C., 600° C., or 700° C., but will vary depending at least in part on the composition of the nanowires 22.

The nanowires 22 can be metallic, ceramic, or combinations thereof. In one example, the nanowires 22 are nickel, copper, iron, molybdenum, yittrium, manganese, aluminum, chromium or cobalt, or alloys thereof. In further examples, the metal of the nanowires 22 is substantially pure. Table 1 below includes further examples of starting materials and reactions for fabricating nanowires.

TABLE 1

Starting materials and reactions for fabricating nanowires
Electrode Potentials of Metals

| Acidic condition | | Alkaline condition | | |
| --- | --- | --- | --- | --- |
| Half-cell reaction | $E_a^0$, V | Half-cell reaction | $E_b^0$, V | Synthesis routes |
| $Y^{3+} + 3e^- \rightarrow Y$ | −2.372 | $Y(OH)_3 + 3e^- \rightarrow Y + 3OH^-$ | −2.81 | wet chemistry + oxide reduction |
| $Mg^{2+} + 2e^- \rightarrow Mg$ | −2.363 | $Mg(OH)_2 + 2e^- \rightarrow Mg + 2OH^-$ | −2.69 | wet chemistry; electrochemical method |
| $Hf^{4+} + 4e^- \rightarrow Hf$ | −1.7 | $HfO(OH)_2 + 2H_2O\ 2e^- \rightarrow Hf + 4OH^-$ | −2.5 | wet chemistry + oxide reduction |
| $Al^{3+} + 3e^- \rightarrow Al$ | −1.662 | $Al(OH)_3 + 3e^- \rightarrow Al + 3OH^-$ | −2.31 | wet chemistry; electrochemical method |
| $ZrO_2 + 4H^+ + 4e^- \rightarrow Zr$ | −1.529 | $ZrO(OH)_2 + H_2O + 3e^- \rightarrow Zr + 4OH^-$ | −2.36 | wet chemistry + oxide reduction |
| $Ta_2O_5 + 10H^+ + 10e^- \rightarrow 2Ta + 5H_2O$ | −0.75 | | | wet chemistry + oxide reduction |
| $Cr^{3+} + 3e^- \rightarrow Cr$ | −0.744 | $Cr(OH)_3 + 3e^- \rightarrow Cr + 3OH^-$ | −1.34 | wet chemistry; electrochemical method; reduction |
| $Co^{2+} + 2e^- \rightarrow Co$ | −0.277 | $Co(OH)_2 + 2e^- \rightarrow Co + 2OH^-$ | −0.73 | wet chemistry; reduction |
| $Ni^{2+} + 2e^- \rightarrow Ni$ | −0.25 | $Ni(OH)_2 + 2e^- \rightarrow Ni + 2OH^-$ | −0.72 | wet chemistry; reduction |
| $N_2 + 5H^+ + 2e^- \rightarrow N_2H_5^+$ | −0.23 | $N_2 + 4H_2O + 4e^- \rightarrow N_2H_4 + 4OH^-$ | −1.16 | Hydrazine reduction |
| $Mo^{3+} + 3e^- \rightarrow Mo$ | −0.2 | $MoO_4^{2-} + 4H_2O + 6e^- \rightarrow Mo + 8OH^-$ | −1.05 | wet chemistry; reduction |
| $WO_3\ (c) + 6H^+ + 6e^- \rightarrow W + 3H_2O$ | −0.09 | $WO_4^{2-} + 4H_2O + 6e^- \rightarrow W + 8OH^-$ | −1.05 | wet chemistry; reduction |
| $ReO_2 + 4H^+ + 4e^- \rightarrow Re + 2H_2O$ | 0.2513 | $ReO_2 + 2H_2O + 4e^- \rightarrow Re + 4OH^-$ | −0.577 | wet chemistry; reduction |

Nickel and its alloys have high temperature resistance, strength, and corrosion resistance and is therefore useful for articles that will be used in severe conditions, such as gas turbine engine articles. In another example, the nanowires 22 are ceramic material. For instance, the ceramic material is selected from oxides, nitrides, carbides, borides, silicides, ternary ceramics (MAX phase materials), and combinations thereof. In further examples, the ceramic material can include at least one of manganese oxide ($MnO_2$), zinc oxide (ZnO), silicon carbide or alumina ($Al_2O_3$).

In another example, the nanowires 22 are a mixture of at least two distinct elemental nanowires, a mixture of ceramic nanowires or a mixture of metal and ceramic nanowires. The mixture of nanowires provides property enhancement by alloying additions in key locations among many other reasons. These and other ceramic nanowires can be fabricated according to known techniques. In an example of a mixture of elemental nanowires could include nickel and copper. An example of a metal and ceramic mixture could be manganese oxide and nickel nanowires were mixed and sintered together to form a nanocellular material.

Intermetallic materials represent an additional class of high temperature materials. In an example route to making intermatallic nanocellular articles, a mixture of nanowires composed of metals and/or ceramics was first prepared. The pre-intermetallic nanowire article was formed of nanowires, followed by heat treatment to produce an inter-metallic nanocellular article, which may be composed of silicides or aluminides. In an example of forming an intermetallic nanocellular article, molybdenum oxide nanowires and silicon nanomaterials were mixed together, consolidated and placed in a mold. Subsequent heat treatment resulted in a nanocellular molybdenum silicide ($MoSi_2$). In yet a further example, a nanowire composed of nickel and aluminum can be used to fabricate a nickel aluminide ($Ni_3Al$).

Once bonded together, there are open cells 34 in between the nanowires 22. The open cells 34 serve to reduce density in comparison to a solid of the same composition, and thus can reduce the weight of an end-use article. For example, the end material after bonding can be a nanocellular material with at least a majority of the cells 34 having a size of less than one micrometer in maximum dimension. In further examples, the maximum size of the cells 34 is 500 nanometers or less, or 250 nanometers or less. The maximum size can be selected in accordance with the desired properties of the end-use article with regard to strength, temperature resistance, creep resistance, fatigue resistance, or other design property. Although nanocellular material can provide good properties, as discussed above, in other alternatives the open pores 34 may be micro- or macro-sized.

Figure 6:
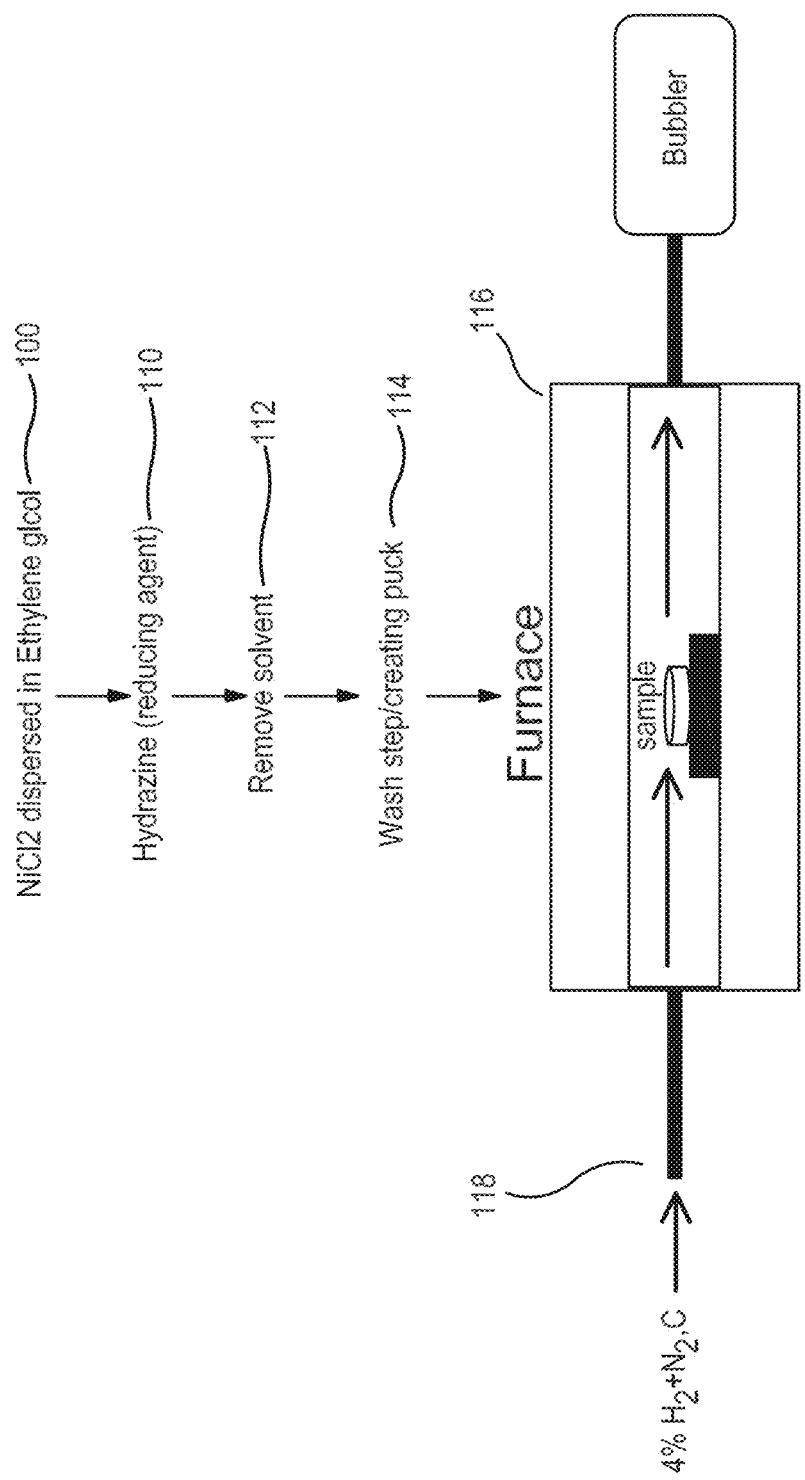
FIG. 6 shows an exemplary method of fabricating nanocellular material disclosed herein.

Referring also to FIG. 6, in one example based on nickel, the arrangement 20 of nanowires 22 is formed by wet chemical synthesis to directly produce the nanowires 22. At 100, the wet chemical synthesis uses an aqueous nickel salt solution, such as nickel chloride. The concentration of nickel in the solution can be varied, but in one example the solution is a one molar solution of nickel in deionized water. Ethylene glycol is added to the solution as a solvent and stirred. At 110, hydrazine is then added as a reducing agent to precipitate nickel. The solvent is removed at 112. The nickel precipitates in the shape of the nanowires 22, which is an elongated, approximately uniform diameter filament shape. The nanowires 22 at this stage form a dispersion, from which the nanowires 22 can be separated, washed, and dried, at 114. The nanowires 22 can be formed into a sample puck. The exemplary embodiment can include placing the nanowire puck into a furnace for sintering, at 116. At 118 a gas containing carbon can be introduced into the furnace, such as, for example, H2+N2, and C-source, in an exemplary embodiment, 4% H2+N2 and C-source. The sintering is conducted so that the nanowire is exposed to the carbon during sintering.

In an exemplary embodiment, the Nickel to Carbon weight ratio can be 5 to 1.5 in the nanowires after the process.

In an alternative exemplary embodiment, the carbon can be introduced in in parallel to the sintering step. The carbon can be introduced to coat the nanowire foam puck 22. Methane gas can flow into the furnace. The methane can decompose into carbon. The carbon coats the surfaces of the nanowire material. In an alternative exemplary embodiment, the carbon source can be introduced via pyrolysis of polymer under inert conditions.

The dried nanowires 22, whether metallic or ceramic, are relatively flexible because of the nanoscale cross-sectional size. Thus, even though metal and ceramic materials may form rigid structures when used in bulk amounts, the nanowires 22 are flexible and resilient at the nanoscale, yet are stiff enough to be self-supporting. The flexibility of the nanowires 22 enables the nanowires 22 to bend in response to stress that the nanowires 22 may be subjected to during fabrication. Moreover, in the loose arrangement, or simply assembly 20, up until final bonding, localized movement of the nanowires 22 is not limited by permanent bonding to neighboring nanowires 22, which allows the nanowires 22 additional freedom to accommodate and mitigate any applied stresses.

In further examples, the dispersion of the nanowires 22 in a carrier fluid can be cast into a geometry of an end-use article. As can be appreciated, forming of the nanowires 22 into a desired geometry is not limited to casting, and other processing techniques can alternatively be used.

Figure 4:
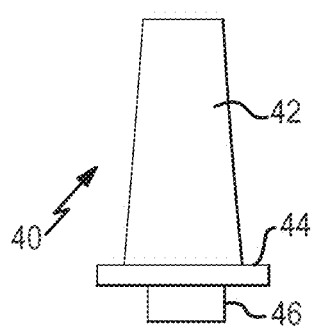
FIG. 4 schematically illustrates a representative portion of a unitary nanocellular structure that has nanowires that are bonded together at bonded nodes.

FIG. 4 schematically illustrates one example article 40, which in this instance is a gas turbine engine airfoil that includes an aerodynamic airfoil section 42, at least one platform section 44, and a root portion 46 for mounting the airfoil. The article 40 is formed, in whole or in part, of a unitary nanocellular structure fabricated by the methods disclosed herein. As can be appreciated, the geometry of the airfoil can be varied, depending upon the needs of a particular application. Furthermore, the article 40 is only one example, and the article 40 can alternatively be another gas turbine engine component, a non-engine component, any other component disclosed herein, or any component that would benefit from being fabricated, in whole or in part, of a unitary nanocellular structure.

By processing the nanocellular structure with carbon introduced during sintering, the nickel/carbon nanocellular foam can demonstrate a 26% improvement in modulus, making it more flexible.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A process of fabricating an article comprising:
    arranging nanowires into an assembly;
    prior to the bonding, forming the assembly of nanowires into a geometry of an end-use article;
    depositing the assembly of nanowires into a mold;
    compressing said assembly of nanowires in said mold to consolidate said nanowires;
    placing said assembly into a furnace; and
    after the compression step, bonding the nanowires together into a unitary cellular structure in the presence of carbon, introducing the carbon by a gas containing carbon into the furnace, wherein said bonding is done in an environment having the gas containing carbon that reacts with the nanowires to alter the composition of the nanowires and the surfaces of the nanowires that are in contact with each other to permanently bond together at nodes, such that cores of the nanowires remain solid and support the unitary cellular structure.

2. The process according to claim 1, wherein said bonding is performed by thermal sintering said nanowires.

3. The process according to claim 1, wherein at least a portion of the nanowires are nickel or a nickel alloy.

4. The process according to claim 1, wherein the assembly of nanowires includes nanowires of differing compositions.

5. The process according to claim 1, wherein at least a portion of the nanowires are a pure metal.

6. The process according to claim 1, wherein at least a portion of the nanowires are a ceramic material.

7. The method as recited in claim 1, wherein said gas containing carbon comprises H2+N2, and C source.

8. The method as recited in claim 1, wherein said gas containing carbon comprises methane gas.

9. The method as recited in claim 1, further comprising: introducing said carbon via pyrolysis of a polymer.

10. A method of fabricating an article, the method comprising:
    providing a dispersion of nanowires in a first carrier fluid;
    combining the dispersion with a solution including at least one alloy element in a second carrier fluid;
    removing the first carrier fluid and the second carrier fluid to provide an arrangement of dry, loose nanowires including the at least one alloy element;
    prior to the bonding, forming the dry, loose nanowires into a geometry of an end-use article
    depositing the arrangement of nanowires into a mold;
    compressing said arrangement of nanowires in said mold to consolidate said nanowires;
    placing said assembly into a furnace; and
    after the compression step, bonding in a furnace in the presence of carbon, the arrangement of nanowires together into a unitary cellular structure, introducing the carbon by a gas containing carbon into the furnace, wherein said bonding is done in an environment having the gas containing carbon that reacts with the nanowires to alter the composition of the nanowires and the surfaces of the nanowires that are in contact with each other to permanently bond together at nodes, such that cores of the nanowires remain solid and support the unitary cellular structure.

11. The method as recited in claim 10, wherein at least a portion of the nanowires are metallic.

12. The method as recited in claim 10, wherein at least a portion of the nanowires are selected from the group consisting of a nickel alloy, ceramic, Fe-based material, Mo-based material, Co-based material, nitrides and the like.

13. The method as recited in claim 10, wherein the bonding includes thermal sintering.

* * * * *